United States Patent
Hosono et al.

(10) Patent No.: US 8,149,798 B2
(45) Date of Patent: Apr. 3, 2012

(54) BASE STATION APPARATUS AND RADIO COMMUNICATION PARAMETER SETTING METHOD

(75) Inventors: Hiroyuki Hosono, Yokohama (JP); Shinichi Mori, Yokosuka (JP); Takatoshi Sugiyama, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 1609 days.

(21) Appl. No.: 11/516,512

(22) Filed: Sep. 7, 2006

(65) Prior Publication Data

US 2007/0093267 A1 Apr. 26, 2007

(30) Foreign Application Priority Data

Oct. 20, 2005 (JP) .................. 2005-305239

(51) Int. Cl.
*H04J 3/06* (2006.01)
*H04B 7/212* (2006.01)
(52) U.S. Cl. ......... 370/338; 370/282; 370/335; 370/350
(58) Field of Classification Search .................. 370/320, 370/321, 328, 329, 330, 342, 350; 455/443, 455/447, 63.3, 67.13
See application file for complete search history.

(56) References Cited

U.S. PATENT DOCUMENTS

| | | | |
|---|---|---|---|
| 5,528,597 A * | 6/1996 | Gerszberg et al. | ............ 370/347 |
| 6,295,290 B1 * | 9/2001 | Soderkvist et al. | ............ 370/347 |
| 6,816,460 B1 | 11/2004 | Ahmed et al. | |
| 7,130,638 B2 | 10/2006 | Chen et al. | |
| 7,193,975 B2 | 3/2007 | Tsutsumi et al. | |
| 7,436,813 B2 * | 10/2008 | Kim et al. | ..................... 370/350 |
| 7,664,090 B2 * | 2/2010 | Anderson et al. | ............. 370/342 |
| 2004/0157613 A1 | 8/2004 | Steer et al. | |
| 2006/0268755 A1 * | 11/2006 | Pajukoski et al. | ............. 370/282 |

FOREIGN PATENT DOCUMENTS

| | | |
|---|---|---|
| CN | 1360446 A | 7/2002 |
| EP | 0 944 274 A2 | 9/1999 |
| EP | 1 041 746 B1 | 10/2000 |
| EP | 1 434 451 A1 | 6/2004 |
| EP | 1 740 002 A1 | 1/2007 |
| JP | 63-073725 | 4/1988 |
| JP | 2000-315978 A | 11/2000 |
| JP | 2001-54158 A | 2/2001 |
| JP | 2001-268127 A | 9/2001 |

(Continued)

OTHER PUBLICATIONS

Japanese Office Action dated Sep. 14, 2010 w/Translation.

(Continued)

*Primary Examiner* — Huy Vu
*Assistant Examiner* — Thai Nguyen
(74) *Attorney, Agent, or Firm* — Crowell & Moring LLP

(57) ABSTRACT

To automatically set up temporarily the parameters required for radio communication, based on the parameters acquired from another base station apparatus existing in the neighborhood. A pair of base station identifier and down scrambling code reported from a base station apparatus in the neighborhood is acquired. The non-overlapping down scrambling code is set to a newly established base station apparatus based on the acquired contents. Whether or not the base station apparatus is located in the neighborhood is judged according to at least one of the Hop number and the required arrival time on a communication path up to the base station apparatus.

2 Claims, 7 Drawing Sheets

FOREIGN PATENT DOCUMENTS

| | | |
|---|---|---|
| JP | 2003-283506 A | 10/2003 |
| JP | 2004-274321 | 9/2004 |
| JP | 2005-175611 A | 6/2005 |
| JP | 2005-244880 A | 9/2005 |
| WO | WO 2005/091667 A1 | 9/2005 |

OTHER PUBLICATIONS

Japanese Office Action dated Dec. 7, 2010.
European Search Report.

* cited by examiner

FIG. 7

| EXISTENT BASE STATION 1001 | | |
|---|---|---|
| PRIORITY ORDER | Sc | BS_ID |
| 1 | Sc#a | BSid#a |
| 2 | Sc#b | BSid#b |
| ⋮ | ⋮ | ⋮ |
| N#1 | Sc#1 | BSid#1 |

| EXISTENT BASE STATION 1002 | | |
|---|---|---|
| PRIORITY ORDER | Sc | BS_ID |
| 1 | Sc#3 | BSid#3 |
| 2 | Sc#c | BSid#c |
| ⋮ | ⋮ | ⋮ |
| N#2 | Sc#2 | BSid#2 |

| EXISTENT BASE STATION 1003 | | |
|---|---|---|
| PRIORITY ORDER | Sc | BS_ID |
| 1 | Sc#2 | BSid#2 |
| 2 | Sc#d | BSid#d |
| ⋮ | ⋮ | ⋮ |
| N#3 | Sc#3 | BSid#3 |

| EXISTENT BASE STATION 1004 | | |
|---|---|---|
| PRIORITY ORDER | Sc | BS_ID |
| — | — | — |

BASE STATION APPARATUS AND RADIO COMMUNICATION PARAMETER SETTING METHOD

BACKGROUND OF THE INVENTION

1. Field of the Invention

The present invention relates to a base station apparatus and a method for setting the radio communication parameters, and particularly to a base station apparatus of multiple access method in which a plurality of users make the communications at the same time by sharing a radio channel, and a method for setting the temporary radio communication parameters.

2. Description of the Related Art

As the multiple access methods in which a plurality of users make the communications by sharing a radio channel, a code division multiple access (CDMA), a time division multiple access (TDMA) and a frequency division multiple access (FDMA) are well known.

For example, in a communication system of code division multiple access method in which the same frequency band is shared among a plurality of communication waves, individual communication waves are distinguished by the spreading codes of random code series. As the spreading code is better in the detection characteristic (auto-correlation characteristic) and the identification characteristic (cross-correlation characteristic) between different spreading codes, the system efficiency is improved. Therefore, all the random combinations of codes determined by the series length are not employed, but the code series to attain the required characteristics are selectively employed. Accordingly, when the high system efficiency is required, the spreading code is limited and the assignable number of spreading codes is below the total number of simultaneous communication waves supposed for the system.

Particularly in the satellite downlink of a W-CDMA (Wideband CDMA) cellular system, the spreading code used is demanded to have the code orthogonality capable of reducing mutual interference between different spreading codes, in addition to the high detection characteristic and identification characteristic, to implement high quality communications even at low transmission power. Therefore, the assignable number of spreading codes is smaller than in the satellite uplink. This small number of spreading codes is repeatedly employed for effective use, but a different code for each cell is employed and superimposed to prevent radio interference between cells.

In the W-CDMA cellular system, the spreading code for actually spreading the user data in the broadband is called a channelization code, and the code for preventing radio interference between cells superimposed for each cell is called a scrambling code.

The number of scrambling codes to distinguish between the cells is not unlimited, in which only 512 kinds are defined in the W-CDMA cellular system. It is necessary that the scrambling code of same kind is not employed in proximity to prevent radio interference.

In the general cellular system, the arrival area of electric wave was estimated for each base station by a computer simulation in which the position of a base station apparatus (herein after simply referred to as a base station) for forming the cell and the apparatus and antenna construction are set up, and the radio network designer manually made the settings so that the scrambling code of same kind may not be set to the base stations in which the arrival areas overlap with the aid of a computer. Therefore, when a new base station was installed corresponding to increased traffic, the designer had to make the settings again.

Also, since the scrambling code is set up based on the estimation of the computer simulation, a radio interference occurs between the scrambling codes of same kind, when there is an error between the actual field and the wave arrival area, whereby it is required to make the settings again. Accordingly, these operations take a lot of time, a labor of the designer, and a trouble of the field confirmor.

There is a technique that the base station autonomously sets up the spreading code (e.g., JP2005-175611A). Also, another technique in which the mobile station acquires the information of the base station, and makes a report to the base station to which the self station is connected, and the base station automatically updates the information was described in JP2001-54158A.

SUMMARY OF THE INVENTION

By the way, a method for automatically deciding the down scrambling code used in the base station was described in JP2004-329360A. With this method, the base station in the W-CDMA cellular system transmits an identifier of base station with the temporary down scrambling code, and decides the permanent down scrambling code, based on a reception report of the base station identifier from the mobile station.

With this method, the down scrambling code dedicated for the new established base station is secured beforehand in the system to obtain the reception report of the base station identifier from the mobile station. In this manner, the down scrambling code of same kind is not set in the newly established base station and the base station located around the newly established base station.

However, with the above method for automatically deciding the down scrambling code, it is required that the down scrambling code dedicated for the newly established base station is secured beforehand in the system, whereby there is a problem that the down scrambling codes perpetually used are restricted, regardless of the number of newly established base stations.

On the other hand, depending on the number of down scrambling codes dedicated for the newly established base station to be secured, there is a problem that the base station can not be newly established until another newly established base station returns the down scrambling code dedicated for the newly established base station, regardless of the number of down scrambling codes used in the existent base station.

However, with the method for automatically deciding the down scrambling code as described in the JP2005-175611A, the down scrambling code in the code division multiple access (CDMA) method is treated, and the time slot in the time division multiple access (TDMA) method or the frequency band in the frequency division multiple access (FDMA) method is not set up.

Also, with the technique as described in the JP2001-54158A, the existence of the mobile station is requisite, and the automatic set-up of the parameters can not be made by only the processing between the base stations.

This invention has been achieved to solve the above-mentioned problems, and it is an object of the invention to provide a base station apparatus and a radio communication parameter setting method in which the parameters required for the radio communication can be automatically set up temporarily based on the parameters acquired from another base station apparatus existing in the neighborhood.

According to claim 1 of the invention, there is provided a base station apparatus comprising parameter acquisition means for acquiring the radio communication parameters required for radio communication from another base station apparatus existing in the neighborhood, and parameter setting means for setting the radio communication parameters for the self station based on the radio communication parameters acquired by the parameter acquisition means. With this configuration, it is possible to automatically set the radio communication parameters temporarily employed by the newly established base station based on the radio communication parameters of the existent base station in the neighborhood.

According to claim 2 of the invention, there is provided the base station apparatus according to claim 1, wherein the parameter acquisition means judges whether or not another base station apparatus exists in the neighborhood from at least one of the Hop number and the required arrival time on a communication path up to the another base station apparatus. With this configuration, it is possible to automatically set the radio communication parameters temporarily used by the newly established base station, based on the radio communication parameters of the existent base station determined to be located in the neighborhood of the newly established base station by the Hop number and the required arrival time.

According to claim 3 of the invention, there is provided the base station apparatus according to claim 1 or 2, wherein when a code division multiple access method is employed, the parameter setting means sets a down scrambling code not overlapping the down scrambling code of the another base station apparatus as a temporary down scrambling code. With this configuration, when the code division multiple access method is employed, it is possible to automatically set the radio communication parameters temporarily used by the newly established base station.

According to claim 4 of the invention, there is provided the base station apparatus according to claim 1 or 2, wherein when a time division multiple access method is employed, the parameter setting means sets a down time slot not overlapping the down time slot of the another base station apparatus as a temporary down time slot. With this configuration, when the time division multiple access method is employed, it is possible to automatically set the radio communication parameters temporarily used by the newly established base station.

According to claim 5 of the invention, there is provided the base station apparatus according to claim 1 or 2, wherein when a frequency division multiple access method is employed, the parameter setting means sets a down frequency band not overlapping the down frequency band of the another base station apparatus as a temporary down frequency band. With this configuration, when the frequency division multiple access method is employed, it is possible to automatically set the radio communication parameters temporarily used by the newly established base station.

According to claim 6 of the invention, there is provided a radio communication parameter setting method comprising a parameter acquisition step of acquiring the radio communication parameters required for radio communication from another base station apparatus existing in the neighborhood, and a parameter setting step of setting the radio communication parameters for the self station based on the radio communication parameters acquired at the parameter acquisition step. With this method, it is possible to automatically set the radio communication parameters temporarily used by the newly established base station, based on the radio communication parameters of the existent base station in the neighborhood.

As described above, the invention has the effect that it is possible to automatically set the radio communication parameters temporarily used by the newly established base station, based on the radio communication parameters of the existent base station in the neighborhood by acquiring the radio communication parameters required for radio communication from another base station apparatus existing in the neighborhood, and setting the radio communication parameters for the self station based on the acquired radio communication parameters.

BRIEF DESCRIPTION OF THE DRAWINGS

FIG. 7 is an explanatory view showing the pair of base station identifier and scrambling code reported by each base station at the time when the newly established base station makes a request for the pair of base station identifier and scrambling code reported by the existent base station.

DETAILED DESCRIPTION OF THE PREFERRED EMBODIMENTS

Figure 1A:
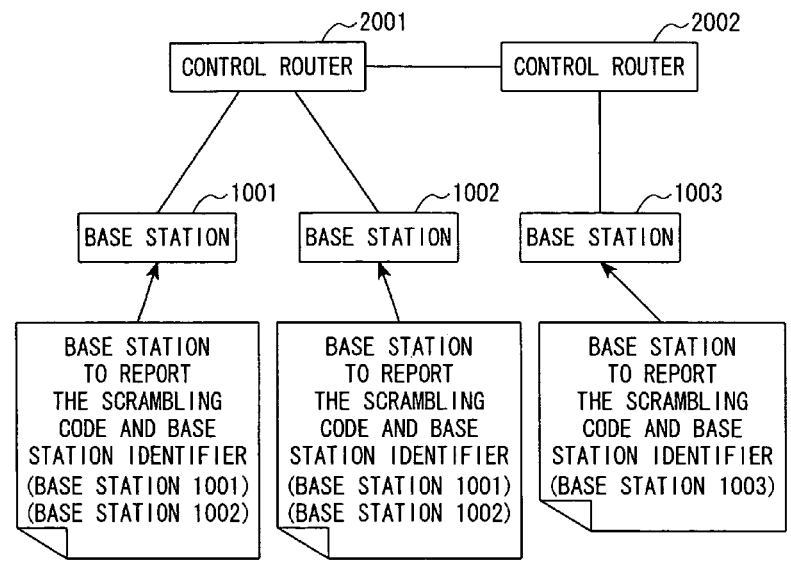
FIGS. 1A and 1B are explanatory views showing the configuration of a radio access network in newly establishing a base station according to an embodiment of the invention.

The preferred embodiments of the present invention will be described below with reference to the drawings. In the following explanation, the parts having the same functions are designated by the same reference numerals or signs throughout the drawings, and the repeated explanation is omitted.

(Configuration Example of Radio Access Network)

Figure 1B:
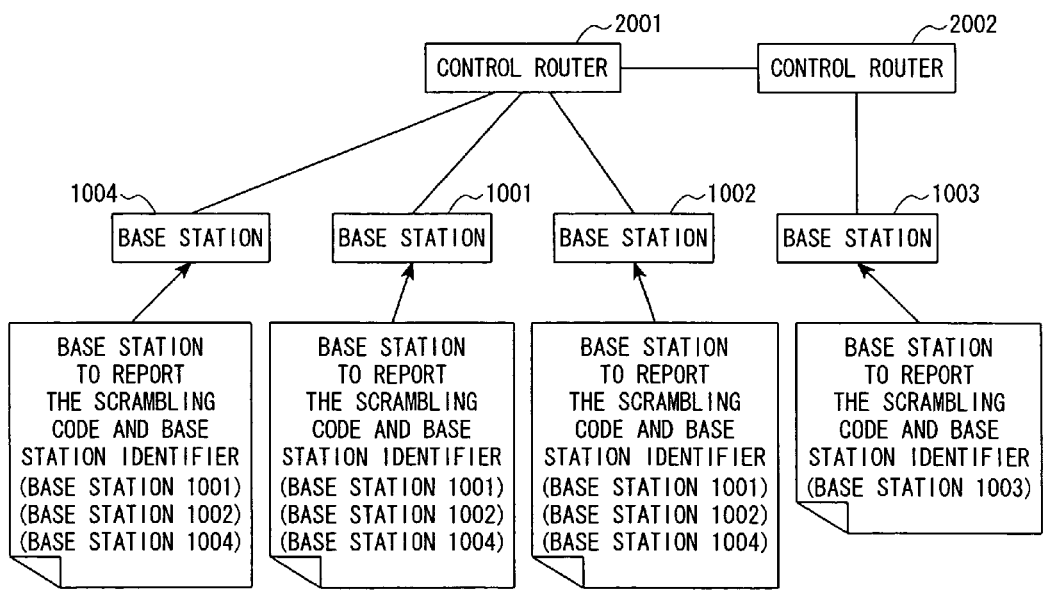

Referring to FIGS. 1A and 1B, a configuration example of a radio access network according to this embodiment will be described below. FIG. 1A shows a state before a base station is newly established, and FIG. 1B shows a state after the base station is newly established.

In the radio access network of this example, a CDMA (Code Division Multiple Access) cellular system is adopted in which a mobile station belonging to a cell and each base station forming the cell make the communication by sharing the same frequency band in a plurality of adjacent cells. This network comprises a base station 100$i$ (i is the natural number) and a control router 200$k$ (k is the natural number). In this example, the base stations 1001 to 1003 and the control routers 2001 and 2002 are provided in the network, as shown in FIGS. 1A and 1B. And the down scrambling code different for each base station forming the cell, namely, the spreading code used for transmission through the satellite downlink is set up. Also, for each base station forming the cell, a pair of base station identifier and scrambling code for the peripheral base station forming the cell located around the cell is set up, and reported to the mobile station belonging to the cell formed by the base station.

Referring to FIG. 1A, in this example, in the base station 1001, the base stations to report the scrambling code and the base station identifier are the base station 1002 and the base station 1001 (i.e., self station). In the base station 1002, the base stations to report the scrambling code and the base station identifier are the base station 1001 and the base station 1002 (i.e., self station). In the base station 1003, the base station to report the scrambling code and the base station identifier is the base station 1003 (i.e., self station alone).

The radio access network of this example may adopt a FDD (Frequency Division Duplex) method or TDD (Time Division Duplex) method of the CDMA. Also, the radio access network according to this embodiment may be a TDMA (Time Division Multiple Access) cellular system or a FDMA (Frequency Division Multiple Access) cellular system, besides the CDMA (Code Division Multiple Access) cellular system.

Each of the base stations 1001, 1002 and 1003 is accommodated in any of the control routers 2001 and 2002. In this example, at first, the base stations 1001 and 1002 are accommodated in the control router 2001 and the base station 1003 is accommodated in the control router 2002, as shown in FIG. 1A. Thereafter, the base station 1004 is newly established and accommodated in the control router 2001, as shown in FIG. 1B. As a result, in the base station 1001, the base stations to report the scrambling code and the base station identifier are the base stations 1002, the base station 1004 and base station 1001 (i.e., self station) in this example, as shown in FIG. 1B. In the base station 1002, the base stations to report the scrambling code and the base station identifier are the base station 1001, the base stations 1004 and the base station 1002 (i.e., self station). In the base station 1003, the base station to report the scrambling code and the base station identifier is the base station 1003 (i.e., self station alone). In the base station 1004, the base stations to report the scrambling code and the base station identifier are the base stations 1001, the base station 1002 and the base station 1004 (i.e., self station).

The base stations 1001 to 1004 are interconnected through the control routers 200 in combinations of base stations. Also, the base station 100 holds a pair of base station identifier and scrambling code for the peripheral base station to which the self base station makes a report, in which its contents can be inquired from another base station.

The identifier of the base station 100*i* required to hold uniqueness in the entire system may be managed by providing a server, and inquired from the control router. For example, a server 300 for managing the identifier of each base station may be provided, and each base station 100*i* or the control router 200*k* may make access to the server 300 via the Internet 400 to make the inquiry, as shown in FIGS. 2A and 2B.

Figure 2A:
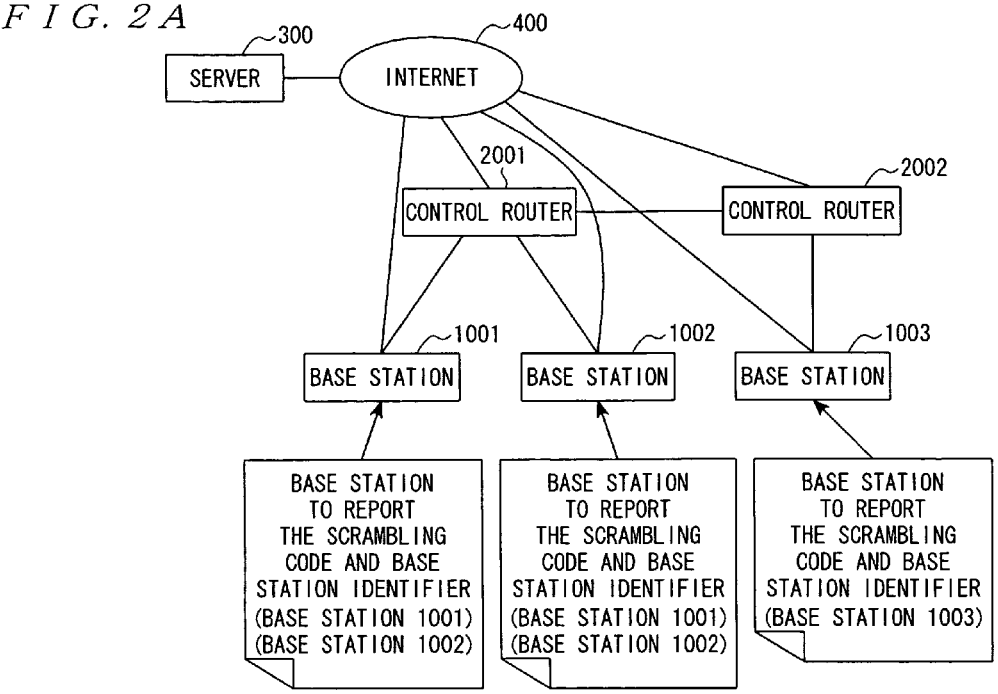
FIGS. 2A and 2B are views showing a configuration example in which a server for managing the identifier of each base station is added in the radio access network of FIGS. 1A and 1B.
Figure 2B:
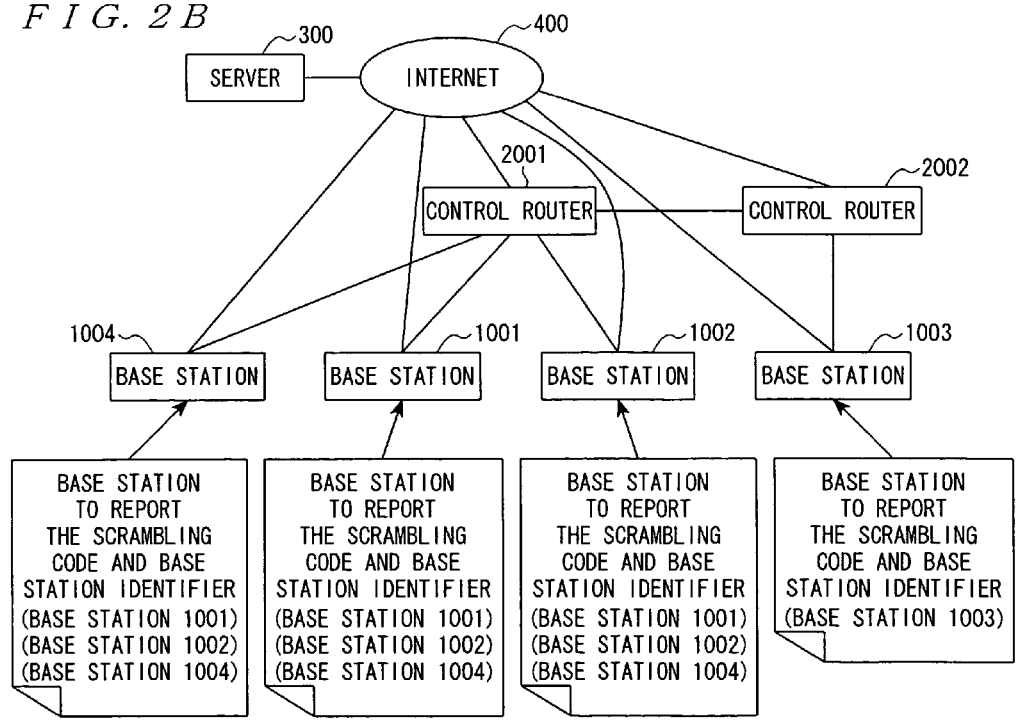

In FIGS. 2A and 2B, the server 300 is logically connected to the control router 200*k* and the base station 100*i*, but no hierarchical relationship between the control router and the base station may be employed in the node configuration. That is, when the base station identifier is transmitted or received between the server 300 and the base station 100*i*, the data transfer may occur without interposition of the control router 200*k*. Conversely, the base station identifier may be transmitted or received via the control router 200*k*.

The number of servers provided is not specifically limited. One server is provided in the entire system, as shown in FIGS. 2A and 2B, but a plurality of servers may be provided to distribute the load, for example.

While in FIGS. 1A, 1B, 2A and 2B, the base stations 1001, 1002 and 1004 are under the control router 2001, and the base station 1003 is under the control router 2002, they are not limited to such affiliated relation but may be in any other affiliated relation.

(Configuration Example of Base Station)

Figure 3:
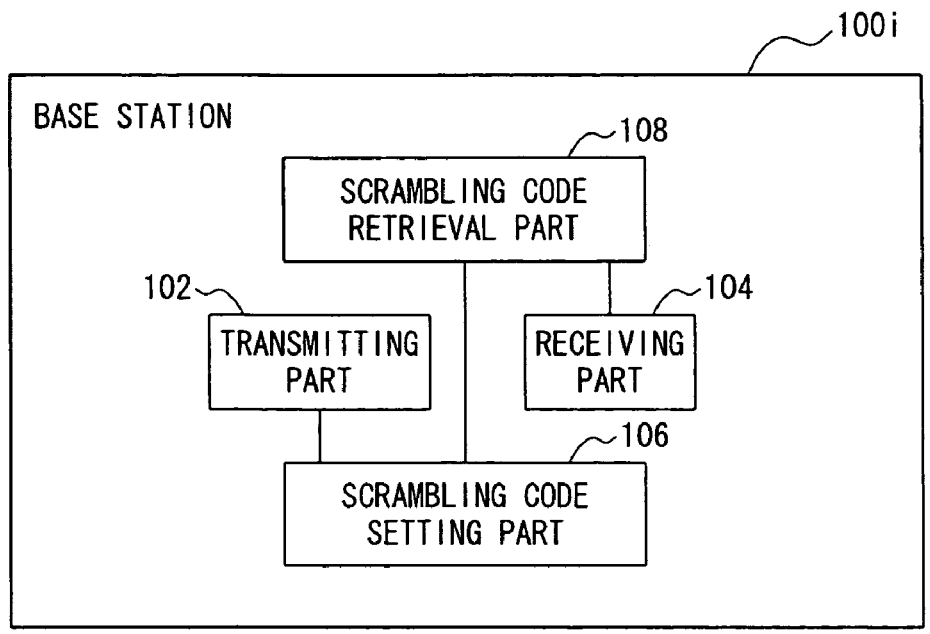
FIG. 3 is a block diagram showing the configuration of the base station according to the embodiment of the invention.

Referring to FIG. 3, a configuration example of the base station 100*i* in FIGS. 1A and 1B will be described below. In FIG. 3, the base station 100*i* of this example comprises a transmitting part 102 for transmitting various signals to the outside, a receiving part 104 for receiving various signals from the outside, a scrambling code setting part 106 connected to the transmitting part 102, and a scrambling code retrieval part 108 connected to the receiving part 104 and the scrambling code setting part 106.

In this configuration, the receiving part 104 receives an identifier of the base station from the control router 200*k*.

In the scrambling code retrieval part 108, the transmitting part 102 transmits a request for notifying a pair of base station identifier and down scrambling code reported by the other base station than the concerned base station to the concerned base station, to the base station other than the concerned base station. Further, in the scrambling code retrieval part 108, a pair of base station identifier and down scrambling code reported by the other base station than the concerned base station, determined as the neighborhood based on the path length via the upper level node between the concerned base station and the other base station than the base station, is set up, among the pairs of base station identifier and down scrambling code reported by the other base station than the concerned base station, received by the receiving part 104. Based on the pair of base station identifier and down scrambling code reported by the other base station than the concerned base station, determined as the neighborhood, which is set up in the scrambling code retrieval part 108, the temporary down scrambling code is set up in the scrambling code setting part 106.

In the transmitting part 102, the transmission of the base station identifier is started on the control channel spread by the set down scrambling code.

(Configuration Example of Control Router)

Figure 4:
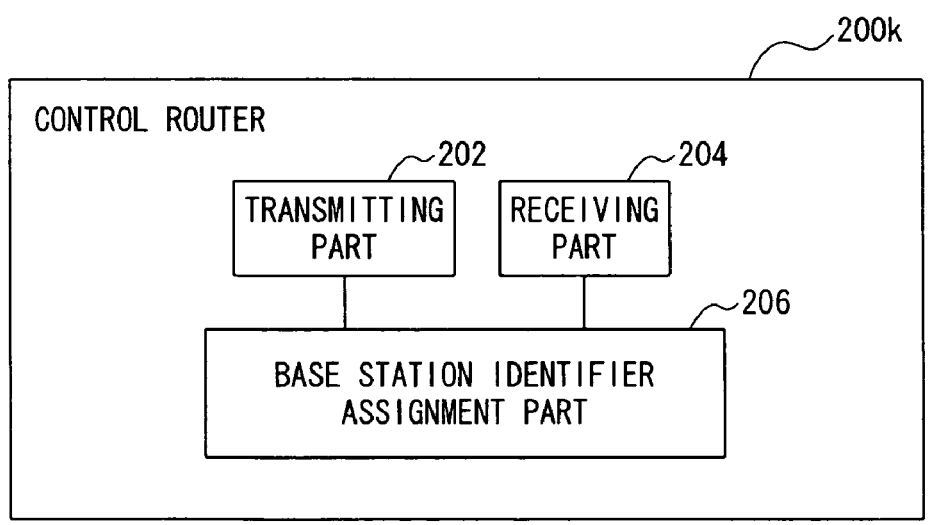
FIG. 4 is a block diagram showing the configuration of a control router according to the embodiment of the invention.

Referring to FIG. 4, the configuration of the control router 200*k* of FIGS. 1A and 1B will be described below. In FIG. 4, the control router 200*k* of this example comprises a transmitting part 202 for transmitting various signals to the outside, a receiving part 204 for receiving various signals from the outside, and a base station identifier assignment part 206 connected to the transmitting part 202 and the receiving part 204.

In this configuration, a request for assigning the identifier of the newly established base station is received by the receiving part 204. In the base station identifier assignment part 206, the transmitting part 202 transmits a request for assigning the base station identifier to the server. Thereafter, the identifier of the newly established base station transmitted from the server is received by the receiving part 204. In the base station identifier assignment part 206, the transmitting part 202 transmits the base station identifier to the newly established base station.

(Case Where the Base Station is Newly Established)

Figure 5:
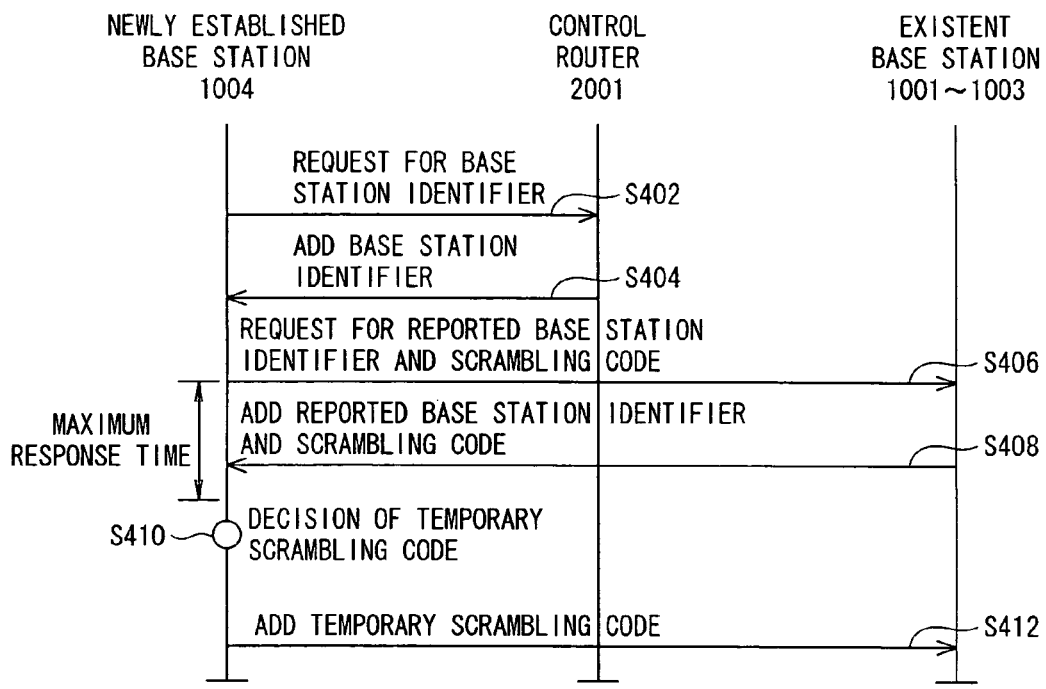
FIG. 5 is a sequence diagram showing a process for newly establishing the base station according to the embodiment of the invention.

Referring to FIG. 5, the operation where the base station is newly established and the newly established base station automatically sets up the temporary scrambling code will be described below. In FIG. 5, communication of signals between the newly established base station 100 and the control router 200 and the existent base station 100 is shown.

In FIG. 5, the newly established base station 1004 is physically wired to the control router 2001. If the power is turned on, a request for assigning the identifier of the newly established base station 1004 is issued to the control router 2001 (step S402). The base station identifier assignment part 206 of the control part 2001 makes an inquiry about the assignable base station identifier to the server and adds the base station identifier received from the server to the newly established base station 1004 (step S404).

Further, the newly established base station 1004 makes a request for notifying the pair of base station identifier and down scrambling code reported by the existent base station 1001 to 1003 to the existent base stations 1001 to 1003. A signal of requesting the pair of base station identifier and down scrambling code is discarded if the signal is relayed via a certain number of routers on the path between the existent base stations 1001 to 1003 connected via the upper level node from the newly established base station 1004 and the newly established base station 1004 (step S406).

Figure 6:
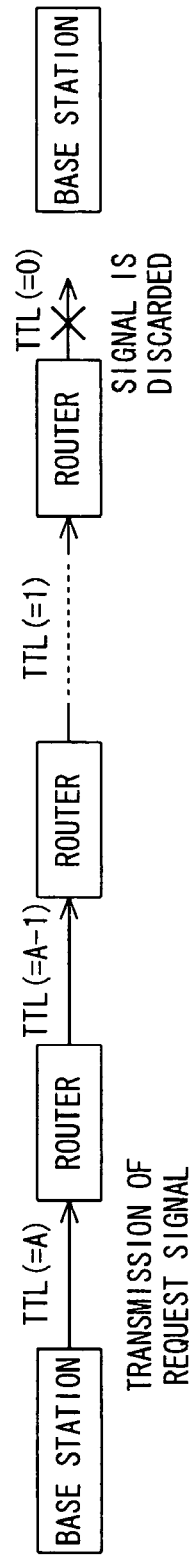
FIG. 6 is a view showing one example for discarding a signal of requesting a pair of base station identifier and down scrambling code if it is relayed via a certain number of routers.

To realize this discard, the Hop number is defined, and decremented at every time of relay. That is, the Hop number (Time To Live: TTL) is defined in transmitting a request signal for requesting the pair of base station identifier and down scrambling code, and decremented at each router located halfway on the path, whereby the request signal can be discarded after the relay via the certain number of routers, as shown in FIG. 6. In the example of FIG. 6, the initial value of TTL is "A", and decremented such as "A", "A-1", "A-2", . . . at every time of passing through the router. And at the stage where the value of TTL is equal to "0", the request signal is not transmitted to the succeeding routers, and the request signal is discarded.

Returning to FIG. 5, the existent base stations 1001 to 1003 add the pair of base station identifier and down scrambling code reported by the self base station (step S408).

Further, the newly established base station 1004 decides the temporary down scrambling code, based on the pair of base station identifier and down scrambling code reported by the existent base station in which the response time is less than or equal to a certain time among the existent base stations 1001 to 1003 (step S410). Thereafter, the newly established base station 1004 adds the decided temporary down scrambling code to the existent base station in which the response time to the request for the pair of base station identifier and down scrambling code is less than or equal to the certain time (step S412).

As described above, the newly established base station acquires the radio communication parameters required for radio communication from another base station (existent base station) located in the neighborhood, and sets up the radio communication parameters for the self station, based on the acquired radio communication parameters.

(Example of Information Reported by the Base Station)

Referring to FIG. 7, the pair of base station identifier and down scrambling code reported by each base station 100 immediately before the existent base stations 1001 to 1003 notify the pair of base station identifier and down scrambling code reported by the self base station to the newly established base station 1004 will be described below.

The pair of base station identifier (BS_ID) and down scrambling code (Sc) reported by the base station is given the priority order in terms of the identifier and the down scrambling code of the base station existing around the concerned base station. The settable number of pairs of base station identifier and down scrambling code is limited to "32", for example, by the system.

Referring to FIG. 7, as the pair of base station identifier and down scrambling code reported by the existent base station 1001, the base station in which the down scrambling code is "Sc#a" and the base station identifier is "BSid#a", and the base station in which the down scrambling code is "Sc#b" and the base station identifier is "BSid#b" are set up. Further, the self base station 1001 in which the down scrambling code is "Sc#1" and the base station identifier is "BSid#1" is also set up.

As the pair of base station identifier and down scrambling code reported by the existent base station 1002, the base station in which the down scrambling code is "Sc#3" and the base station identifier is "BSid#3", and the base station in which the down scrambling code is "Sc#c" and the base station identifier is "BSid#c" are set up. Further, the self base station 1002 in which the down scrambling code is "Sc#2" and the base station identifier is "BSid#2" is also set up.

As the pair of base station identifier and down scrambling code reported by the existent base station 1003, the base station in which the down scrambling code is "Sc#2" and the base station identifier is "BSid#2", and the base station in which the down scrambling code is "Sc#d" and the base station identifier is "BSid#d" are set up. Further, the self base station 1003 in which the down scrambling code is "Sc#3" and the base station identifier is "BSid#d" is also set up.

In the newly established base station 1004, the pair of base station identifier and down scrambling code reported by the self station is not yet set up.

(Decision of Temporary Down Scrambling Code)

Figure 8:
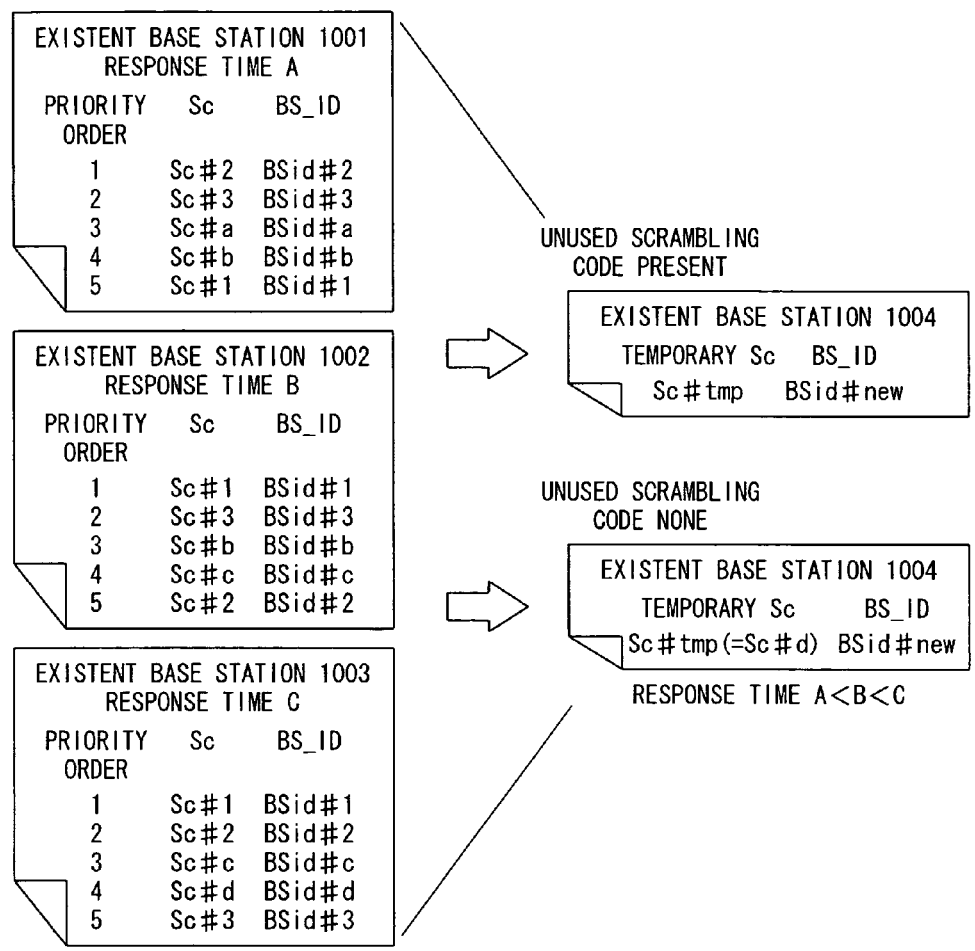
FIG. 8 is an explanatory view showing a process for deciding the temporary scrambling code based on the base station identifier and the scrambling code reported by the existent base station.

Referring to FIG. 8, a method in which the newly established base station 1004 decides the temporary down scrambling code from the pair of base station identifier and down scrambling code reported by the existent base stations 1001 to 1003 will be described below.

In FIG. 8, the newly established base station 1004 acquires the pair of base station identifier and down scrambling code reported by each of the existent base stations 1001 to 1003. In this example, the reported down scrambling codes "Sc#a", "Sc#b", Sc#c", "Sc#d", "Sc#1", "Sc#2" and "Sc#3" are acquired. And the newly established base station 1004 decides the other down scrambling code than the reported down scrambling codes as the temporary down scrambling code "Sc#tmp", and sets it to the self station. That is, if there is any unused (empty) down scrambling code, it is set as the temporary down scrambling code "Sc#tmp".

If there is no unused (empty) down scrambling code, the down scrambling code having the lowest priority order other than the scrambling codes "Sc#1", "Sc#2" and "Sc#3" of the existent base stations 1001 to 1003, among the pairs of base station identifier and down scrambling code reported by the existent base station 1003 having the longest response time, is decided as the temporary down scrambling code "Sc#tmp", and set to the self station. In this example, the down scrambling code "Sc#d" is set to the self station, based on the pair of base station identifier and down scrambling code reported by the existent base station 1003 having the longest response time C among the response times A, B and C.

Herein, the "response time" is the time since the newly established base station 1004 makes a request for the pair of base station identifier and down scrambling code reported by each base station 100 to the base station 100 till it receives a notification of the pair of base station identifier and down scrambling code reported by each base station 100. Instead of the "response time", the "number of routers" for routing a request signal of the newly established base station to make a request for the pair of base station identifier and down scrambling code reported by each base station 100 to the base station 100 or a notification signal of each base station to notify the pair of base station identifier and down scrambling code reported by the self base station 100 to the newly established base station may be based on.

In this manner, when the newly established base station sets up the down scrambling code, the temporary down scrambling code can be set up by referring to the pair of base station identifier and down scrambling code reported by the base station determined as the neighborhood based on the length of the path between the newly established base station and the base station connected via the upper level node to the newly established base station, and it is unnecessary to secure before hand the down scrambling code in the system. This method is different from the method for using the down scrambling code secured beforehand in the system as the temporary down scrambling code in causing the mobile station to transmit a measurement report of the base station identifier to decide the perpetual down scrambling code in the newly established base station.

(Variant Example)

While in the above embodiment the down scrambling code not overlapping the down scrambling code of another base station is set as the temporary down scrambling code in the CDMA system, the invention may be applied to the TDMA system or FDMA system. That is, for the setting of the temporary downtime slot in the TDMA system, or the setting of the temporary down frequency band in the FDMA system, the temporary radio communication parameters can be likewise setup. In this case, each base station reports the down time slot or down frequency band together with the base station identifier, and the newly established base station acquires the reported information, whereby the non-overlapping down time slot or the non-overlapping down frequency band may be set up as the temporary down time slot or down frequency band, based on the acquired contents.

(Radio Communication Parameter Setting Method)

In the radio access network constituted employing the base station apparatus, the following radio communication parameter setting method is implemented. That is, the radio communication parameter setting method comprises a parameter acquisition step of acquiring the radio communication parameters required for radio communication from another base station apparatus existing in the neighborhood, and a parameter setting step of setting the radio communication parameters for the self station based on the radio communication parameters acquired at the parameter acquisition step. Employing this method, the radio communication parameters temporarily used by the newly established base station can be automatically set up, based on the radio communication parameters of the existent base station in the neighborhood.

The invention is applicable to a multiple access system for allowing a plurality of users to make the communications at the-same time by sharing a radio channel.

What is claimed is:

1. A base station apparatus comprising:
   a receiving part for receiving a scrambling code for preventing radio interference between cells from another base station apparatus existing in a neighborhood, when a code division multiple access method is employed;
   a searching part for determining whether or not the another base station apparatus exists in the neighborhood, based upon an arrival time on a communication path up to the another base station apparatus; and
   a setting part for setting, when the searching part determines that the another base station apparatus exists in the neighborhood, a scrambling code that is not used and that is not the scrambling code received by the receiving part, as a temporary downlink scrambling code for the base station apparatus, and for setting, when there is no scrambling code that is not used, a scrambling code having a lowest priority order other than the scrambling code of the another base station apparatus determined to exist in the neighborhood among scrambling codes received from a further another base station apparatus having a longest response time, as the temporary downlink scrambling code.

2. A radio communication parameter setting method comprising:
   receiving a scrambling code for preventing radio interference between cells from another base station apparatus existing in a neighborhood, when a code division multiple access method is employed;
   determining whether or not the another base station apparatus exists in the neighborhood, based upon an arrival time on a communication path up to the another base station apparatus; and
   setting, when the determining determines that the another base station apparatus exists in the neighborhood, a scrambling code that is not used and that is not the scrambling code received at the receiving, as a temporary downlink scrambling code for the base station apparatus, and setting, when there is no scrambling code that is not used, a scrambling code having a lowest priority order other than the scrambling code of the another base station apparatus determined to exist in the neighborhood among scrambling codes received from a further another base station apparatus having a longest response time, as the temporary downlink scrambling code.

* * * * *